(12) United States Patent
Ghebremeskel et al.

(10) Patent No.: US 10,858,457 B2
(45) Date of Patent: *Dec. 8, 2020

(54) PARTICULATE POLYVINYL ALCOHOL COPOLYMERS, PROCESS FOR MAKING AND USES OF THE SAME

(71) Applicant: KURARAY CO., LTD., Kurashiki (JP)

(72) Inventors: Ghebrehiwet Ghebremeskel, Houston, TX (US); Masaki Kato, Houston, TX (US); Yuta Taoka, Houston, TX (US)

(73) Assignee: KURARAY CO., LTD., Kurashiki (JP)

(*) Notice: Subject to any disclaimer, the term of this patent is extended or adjusted under 35 U.S.C. 154(b) by 149 days.

This patent is subject to a terminal disclaimer.

(21) Appl. No.: 16/033,718

(22) Filed: Jul. 12, 2018

(65) Prior Publication Data

US 2019/0055326 A1    Feb. 21, 2019

Related U.S. Application Data

(60) Provisional application No. 62/546,781, filed on Aug. 17, 2017.

(51) Int. Cl.
| | | |
|---|---|---|
| *C08F 8/12* | (2006.01) | |
| *C09D 129/04* | (2006.01) | |
| C08F 218/08 | (2006.01) | |
| C08F 216/06 | (2006.01) | |

(52) U.S. Cl.
CPC .............. *C08F 8/12* (2013.01); *C09D 129/04* (2013.01); *C08F 216/06* (2013.01); *C08F 218/08* (2013.01)

(58) Field of Classification Search
CPC ........ C08F 8/12; C08F 216/06; C08F 218/08; C08F 6/02; C08F 2800/10; C08F 2500/24; C08F 220/14; C08F 220/1802; C08F 220/1803; C08F 220/1804; C08F 220/1805; C08F 220/1806; C08F 220/1807; C08F 220/1808

See application file for complete search history.

(56) References Cited

U.S. PATENT DOCUMENTS

| | | | |
|---|---|---|---|
| 4,747,976 A * | 5/1988 | Yang | ...................... C11D 3/046 510/220 |
| 4,772,663 A | 9/1988 | Marten et al. | |
| 5,300,566 A | 4/1994 | Pinschmidt, Jr. et al. | |
| 7,439,300 B2 * | 10/2008 | Yanai | ........................ C08J 3/05 524/503 |
| 2012/0164424 A1 | 6/2012 | Vicari et al. | |
| 2017/0260309 A1 * | 9/2017 | Collins | ................ C09D 129/04 |

FOREIGN PATENT DOCUMENTS

| | | |
|---|---|---|
| EP | 0 275 081 A2 | 7/1988 |
| EP | 0 275 081 A3 | 7/1988 |
| GB | 1 208 822 | 10/1970 |
| WO | WO 2012/087821 A1 | 6/2012 |

OTHER PUBLICATIONS

International Search Report and Written Opinion dated Jan. 3, 2019 in PCT/US2016/000219, citing documents AA, AO, AP and AQ therein, 19 pages.

* cited by examiner

*Primary Examiner* — Robert C Boyle

(74) *Attorney, Agent, or Firm* — Oblon, McClelland, Maier & Neustadt, L.L.P.

(57) ABSTRACT

The present invention relates generally to a highly-hydrolyzed polyvinyl alcohol composition having increased cold-water solubility, a process for making such a polyvinyl alcohol composition, and various end uses thereof.

20 Claims, 3 Drawing Sheets

PARTICULATE POLYVINYL ALCOHOL COPOLYMERS, PROCESS FOR MAKING AND USES OF THE SAME

CROSS REFERENCE TO RELATED APPLICATIONS

This application claims priority under 35 U.S.C. § 119 from U.S. Provisional Application Ser. No. 62/546,781 (filed 17 Aug. 2017), the disclosure of which is incorporated by reference herein for all purposes as if fully set forth.

FIELD OF THE INVENTION

The present invention relates generally to a highly-hydrolyzed polyvinyl alcohol composition having increased cold-water solubility, a process for making such a polyvinyl alcohol composition, and various end uses thereof.

Particularly, the polyvinyl alcohol composition comprises particulate agglomerates of particles of a highly-hydrolyzed polyvinyl alcohol/lower alkyl acrylate copolymer containing reduced lactone ring content, which can be produced by slurry alcoholysis of a polyvinyl acetate copolymer in the presence of a basic catalyst with limited or no subsequent residual catalyst neutralization, as well as other process changes to further increase the cold-water solubility as discussed in more detail below.

The polyvinyl alcohol composition in accordance with the present invention comprises such particulate polyvinyl alcohol copolymer agglomerates having the unique and advantageous morphology and surface area properties of slurry alcoholysis-made polyvinyl alcohol copolymers, but increased cold-water solubility as compared to conventionally produced particulate polyvinyl alcohol copolymer agglomerates.

The polyvinyl alcohol composition in accordance with the present invention can be utilized, for example, in adhesive compositions, in paper coating compositions including thermal paper, in coated board applications, as a carrier for optical brightening agents, as emulsion stabilizers, in pulp and for various fiber end uses, in wet end paper making, as encapsulants, in water-soluble films, in oilfield uses such as drilling muds, refracting, completion fluid and cements, in structural materials such as gypsum board, gypsum putty, wall putty, joint compound and cement additive, in textile sizing, and in paving materials such as polymeric sand and cement.

BACKGROUND OF THE INVENTION

Polyvinyl alcohol is a well-known polymer and is generally commercially available in many forms for a variety of end uses.

Polyvinyl alcohol cannot readily be produced directly from vinyl alcohol. Instead, polyvinyl alcohol is produced on a commercial scale by polymerizing vinyl acetate (with optional comonomers) to generate polyvinyl acetate, after which the acetate groups are hydrolyzed to hydroxyl groups in varying degrees. Several different hydrolysis methods are well known and can be used for this purpose.

The present invention relates to polyvinyl alcohol copolymers generated by the slurry alcoholysis of a vinyl acetate copolymer including minor amounts of structural units derived from a lower alkyl acrylate ester comonomer, which produces vinyl alcohol copolymer particulates of a specific morphology due to the conditions maintained during the slurry alcoholysis, as discussed below.

Polyvinyl acetate homopolymers and copolymers, the starting material for polyvinyl alcohol homopolymers and copolymers, are commercially produced by the free radical polymerization of the vinyl acetate monomer with optional comonomers in the presence of a polymerization catalyst. The solvent commonly used in the commercial polymerization of vinyl acetate is methanol. The polymerization is conducted in the temperature range of 10° C. to 80° C. The lower end of the polymerization range is known to give products with improved properties. The percent conversion of vinyl acetate to polyvinyl acetate can vary over a wide range. Though conversions ranging from 20% to 100% have been found satisfactory, commercially at least about 30% conversion is preferable. The degree of polymerization of vinyl acetate and optional comonomers typically varies anywhere from about 400 to about 10000.

The polyvinyl acetate is converted to polyvinyl alcohol via hydrolysis or alcoholysis processes generally known to those of ordinary skill in the relevant art. In such processes, the polyvinyl acetate is contacted with an alkali catalyst such as sodium hydroxide or sodium methylate. The major products of this reaction are polyvinyl alcohol and methyl acetate.

One such generally known process is slurry alcoholysis, which is typically performed in methanol in the presence of an alkali catalyst such as sodium hydroxide or sodium methylate, such as disclosed in U.S. Pat. No. 2,734,048. The alkali-catalyzed slurry alcoholysis of methanol solutions of polyvinyl acetate is typically conducted at temperatures between about 55° C. to about 70° C. In this temperature range, three distinct phases occur successively as the alcoholysis reaction proceeds. Starting as a homogeneous solution the solubility of the polyvinyl acetate in methanol decreases as increasing numbers of acetate groups are converted to hydroxyl groups. When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to a finely-divided solid insoluble in the alcohol. The collapsing gel traps and sticks together with the fine particles from the previous alcoholysis cycle producing polyvinyl alcohol of a specific morphology, which is a "popcorn" type particle made up of agglomerates of individual polyvinyl alcohol particles, such as shown in FIG. 1, as compared to particles made by other conventional hydrolysis processes, such as shown in FIG. 2.

Ultimately, the polyvinyl alcohol produced is not soluble in the methanol and methyl acetate solvent system and is obtained as a slurry.

Once the desired degree of alcoholysis (hydrolysis) is attained, in conventional processes the catalyst is neutralized with an acid such as acetic acid. The degree of hydrolysis refers to the percentage of acetate groups that are converted to hydroxyl groups. For most commercial polyvinyl alcohols, the degree of hydrolysis varies from 70% to about 100% (maximum).

In commercial continuous slurry alcoholysis processes to produce highly-hydrolyzed polyvinyl alcohol, after neutralization the resulting slurry is heat treated at temperatures of 110° C. or greater. From the heat treatment, the slurry is cooled and the polymer is separated from the methanol/methyl acetate solvent system to generate a polyvinyl alcohol cake. The polyvinyl alcohol cake is then typically washed with methanol to reduce ash content and other contaminants (purified), then the resulting polyvinyl alcohol particles are filtered and dried to a particulate product which is desirably a free-flowing powder.

This ultimately results in a highly-crystalline polyvinyl alcohol product having certain particle size, surface area and bulk density, low water solubility (warm and cold) and low swelling volume properties.

Highly-hydrolyzed polyvinyl alcohols from all conventional alcoholysis/hydrolysis processes tend to have especially poor cold-water solubility.

Many of the important uses of polyvinyl alcohols are in the form of aqueous solutions; however, preparation of an aqueous solution, particularly at high concentration, can be challenging. Slurrying the polyvinyl alcohol in water at room temperatures and then heating the slurry to the temperature necessary to achieve the dissolution of the polymer is a common way of doing so. Conventional polyvinyl alcohols with a degree of hydrolysis greater than 98% are relatively insoluble in water at temperatures below 70° C. and the characteristics of their room temperature water slurry can vary considerably depending on the conditions maintained during the alcoholysis of the parent polyvinyl acetate and the heat history applied to the polyvinyl alcohol. Polyvinyl alcohols which are moderately hydrolyzed (70-90%) have good to excellent cold-water solubility, but highly-hydrolyzed (93% or greater) polyvinyl alcohols have very low cold-water solubility.

The addition of comonomers such as lower alkyl acrylate esters in and of itself can improve water solubility of polyvinyl alcohols by lowering crystallinity of the resulting polymers; however, in hydrolysis of copolymers of vinyl acetate with minor amounts of an acrylate such as methyl acrylate by conventional processes, the resulting acrylate structures cyclize with neighboring hydroxyl groups to form lactone rings. As is known from JP S49-36797 (1974), the presence of lactone rings reduces water solubility of the polyvinyl alcohol (co)polymer, and thus offsets to a great extent the water-solubility benefit of lower crystallinity.

Polyvinyl alcohol/methyl acrylate copolymers produced by slurry alcoholysis (agglomerated particles of a "popcorn" morphology) with a high percentage of lactone rings and low cold-water solubility are commercially available under the trade designation ELVANOL™ 80-18 (Kuraray America, Inc., Houston, Tex. USA). Water solubility at 20° C. of this product is on the order of about 3 wt % (measured as set forth in the examples below).

In commonly-owned US2017/0260309A1, improved water solubility of polyvinyl alcohol homopolymers and copolymers produced by slurry alcoholysis was achieved by limiting or removing the heat treatment of the intermediate slurry subsequent to the neutralization step to increase the amorphous content (lower crystallinity) of the resulting polymer. The resulting polyvinyl alcohols are thus improved in their cold-water slurrying properties, but are not sufficiently cold-water soluble for many desired end uses.

WO2012/087821A1 purports to disclose a highly-hydrolyzed polyvinyl alcohol/methyl acrylate copolymer with a high content of lactone rings and good cold-water solubility by utilizing a vinyl acetate copolymer starting material prepared through a special 2-stage polymerization process, but the resulting polyvinyl alcohol copolymers do not have the desirable morphology of slurry alcoholysis produced polyvinyl alcohols. Further, while it is shown that films of the polyvinyl alcohol copolymers can dissolve under controlled conditions, there is no specific measure of cold-water solubility of the polyvinyl alcohol copolymer itself.

It would, therefore, be desirable to provide a highly-hydrolyzed polyvinyl alcohol copolymer, with the particle morphology obtained via slurry alcoholysis, that has improved cold-water solubility, as well as a process for producing such highly-hydrolyzed polyvinyl alcohols that can be operated commercially.

SUMMARY OF THE INVENTION

In a first aspect, the invention provides a process for preparing a polyvinyl alcohol composition of particulate agglomerated polyvinyl alcohol particles, comprising the steps of:

providing to an alcoholysis unit (i) a solution of a polyvinyl acetate in a solvent and (ii) an alkali catalyst, wherein the polyvinyl acetate is a copolymer of a monomer component consisting essentially of vinyl acetate with one or more lower alkyl acrylate ester monomers in an amount up to about 20 mol %, based on the total monomer component;

combining the solution and the alkali catalyst in the alcoholysis unit under agitation to hydrolyze the polyvinyl acetate to produce a first slurry comprising (i) a polyvinyl alcohol having a degree of hydrolysis of about 93% or greater and (ii) residual alkali catalyst;

removing the first slurry from the alcoholysis unit;

separating polyvinyl alcohol from the first slurry to produce a polyvinyl alcohol wet cake; and drying the polyvinyl alcohol wet cake to produce the particulate agglomerated polyvinyl alcohol particles, wherein the residual alkali catalyst in the first slurry is predominantly not neutralized prior to the drying step.

In another embodiment, the first slurry is removed from the alcoholysis unit at a first temperature, and the temperature of the first slurry is reduced to less than the first temperature prior to or concurrently with the separating step.

In a second aspect, the present invention provides a polyvinyl alcohol composition prepared by the above process.

In a third aspect, the present invention provides a polyvinyl alcohol composition of particulate agglomerated polyvinyl alcohol particles, wherein:

(1) the polyvinyl alcohol is a copolymer of a monomer component consisting essentially of vinyl acetate with one or more lower alkyl acrylate ester monomers in an amount up to about 20 mol %, based on the total monomer component, with a degree polymerization of from about 400 to about 10000, and a degree of hydrolysis of about 93% or greater; and (2) the composition has a D(90) particle size of from about 1 μm to about 1000 μm, a bulk density of about 0.55 g/cm3 or less, and a cold-water (20° C.) solubles of about 50% or greater (measured as set forth in the examples).

In a fourth aspect, the present invention provides a polyvinyl alcohol composition produced in a slurry alcoholysis process using an alcoholysis catalyst, in which the alcoholysis catalyst has not been predominantly neutralized, wherein the polyvinyl acetate is a copolymer of a monomer component consisting essentially of vinyl acetate with one or more lower alkyl acrylate ester monomers in an amount up to about 20 mol %, based on the total monomer component; and wherein the polyvinyl alcohol has a reduced lactone ring content as compared to a polyvinyl alcohol produced under the same conditions except that a predominant amount (or substantially all) of the residual catalyst has been neutralized.

The limitation (or more desirably elimination) of a residual catalyst neutralization step has been found to decrease the content of lactone rings while maintaining the overall agglomerated shape (popcorn-ball morphology) and other advantageous properties of slurry alcoholysis produced polyvinyl alcohols.

The present invention, therefore, discloses a process for producing a highly-hydrolyzed polyvinyl alcohol by the slurry alcoholysis process with properties which include: "popcorn ball" morphology, lower percent crystallinity and higher cold-water solubility. Polyvinyl alcohols with such properties can be utilized, for example, in adhesive compositions, in paper coating compositions including thermal paper, in coated board applications, as a carrier for optical brightening agents, as emulsion stabilizers, in pulp and for various fiber end uses, in wet end paper making, as encapsulants, in water-soluble films, in oilfield uses such as drilling muds, refracting, completion fluid and cements, in structural materials such as gypsum board, gypsum putty, wall putty, joint compound and cement additive, in textile sizing, and in paving materials such as polymeric sand and cement, but is by no means limited to such uses.

These and other embodiments, features and advantages of the present invention will be more readily understood by those of ordinary skill in the art from a reading of the following detailed description.

DETAILED DESCRIPTION

Figure 1B:
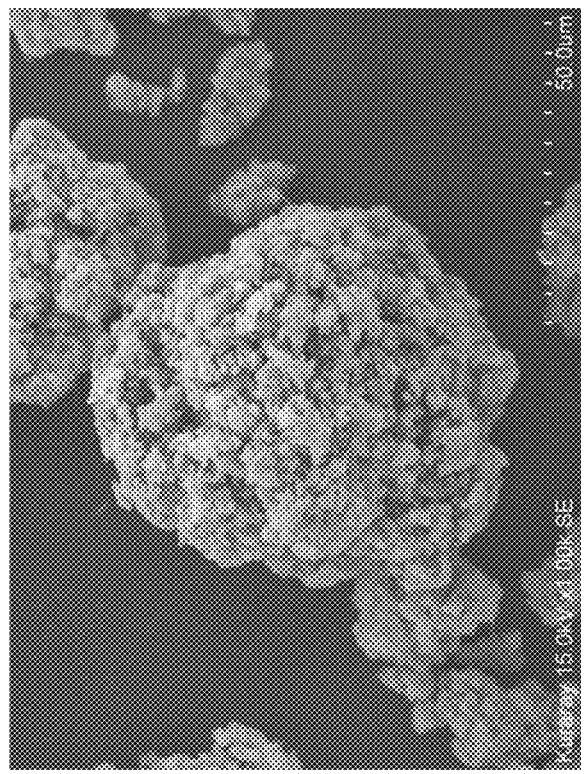
FIGS. 1A and 1B are scanning electron microscope images, at a scale of 100 microns and 50 microns, respectively, showing in general the "popcorn ball" morphology of polyvinyl alcohol particulates produced by slurry alcoholysis.
Figure 1A:
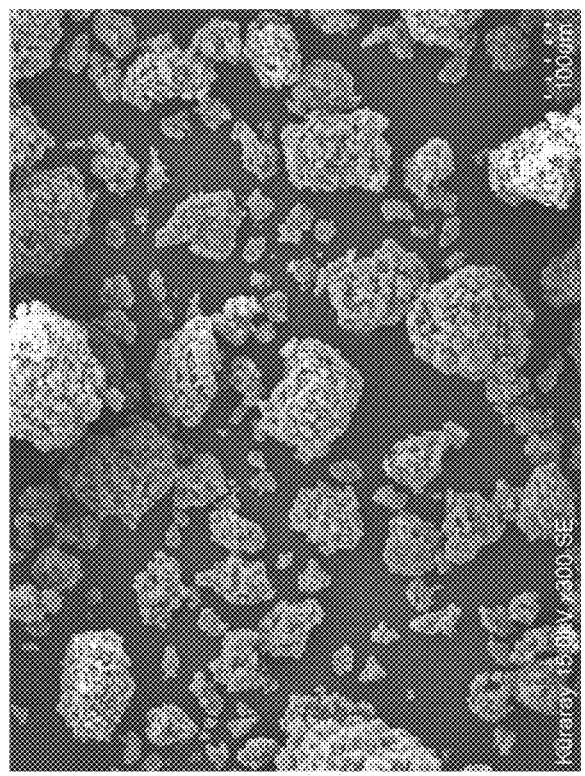
Figure 2B:
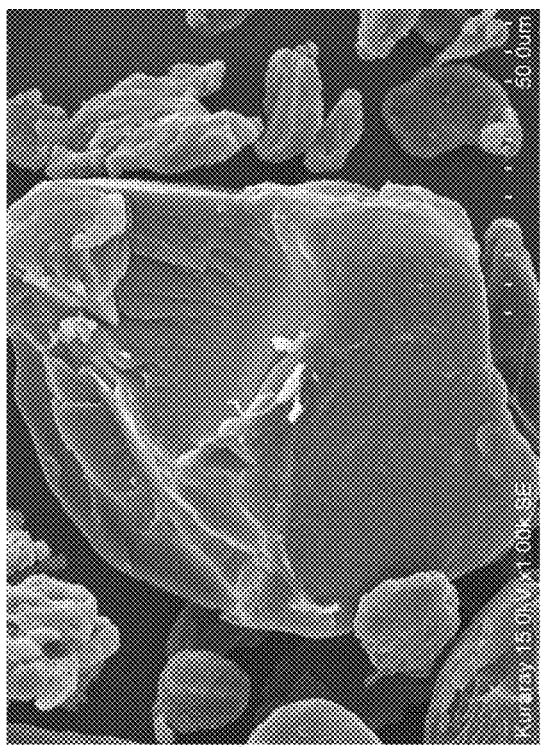
FIGS. 2A and 2B are scanning electron microscope images, at a scale of 100 microns and 50 microns, respectively, of polyvinyl alcohol particulates produced by another type of conventional hydrolysis.
Figure 2A:
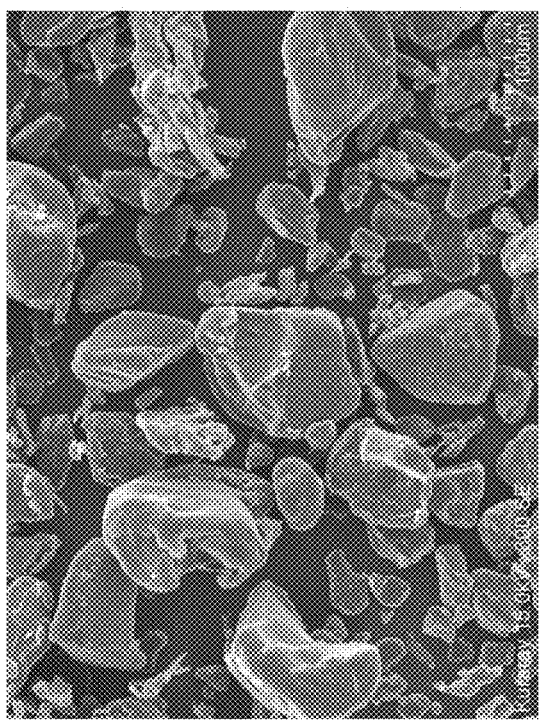

The present invention relates to a polyvinyl alcohol product, a process for preparing such polyvinyl alcohol product and for various end uses of such polyvinyl alcohol product. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute.

Pressure differences, however, are expressed as absolute (for example, pressure 1 is 25 psi higher than pressure 2).

When an amount, concentration, or other value or parameter is given as a range, a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Production Process

In accordance with the present invention, polyvinyl alcohol is produced by a slurry alcoholysis process in which polyvinyl alcohol is obtained from polyvinyl acetate and recovered as a slurry in a methanol and methyl acetate solvent system. The process of the invention is desirably continuous. The slurry alcoholysis process is in a general sense well known to those of ordinary skill in the relevant art, such as disclosed in previously incorporated U.S. Pat. No. 2,734,048, but modified as provided herein. Further details are provided below.

Figure 3:
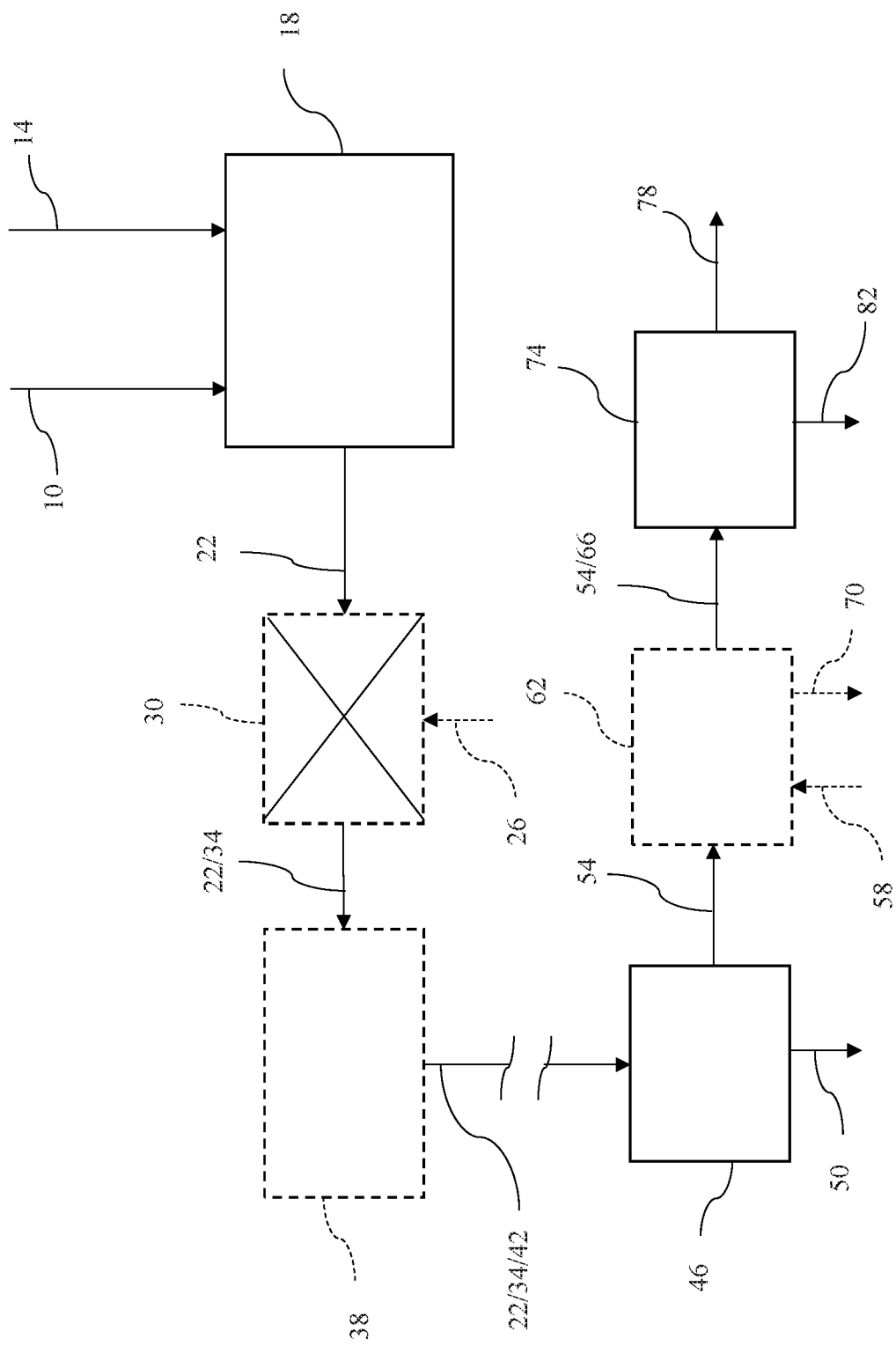
FIG. 3 is a general diagram of a process in accordance with the present invention.

Referring to FIG. 3, a first solution (10) of typically about 30 wt % to about 60 wt % polyvinyl acetate in methanol, and a second solution (14) of dilute sodium methylate alcoholysis catalyst in methanol, are continuously fed to an alcoholysis unit (18) wherein the reaction proceeds to produce a first slurry (22) of the alcoholyzed polyvinyl acetate (polyvinyl alcohol) and methyl acetate.

Catalyst amount typically ranges from about 0.2 wt % to about 0.5 wt % based on the weight of the reaction mixture.

The temperature of the alcoholysis reaction in alcoholysis unit (18) is typically from about 58° C., or from about 64° C., to about 70° C., or to about 68° C. The pressure within alcoholysis unit (18) ranges from slightly below atmospheric pressure to slightly above atmospheric pressure, but is typically slightly above atmospheric pressure.

The alcoholysis unit (18) contains an agitation means so that the alcoholysis is at least partially conducted under agitation conditions. Such agitation means are well known to those of ordinary skill in the relevant art.

As discussed previously, when the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol of the desired "popcorn ball" morphology.

In one embodiment, the alcoholysis unit (18) is made up of a primary alcoholysis vessel where the reaction proceeds to produce a slurry of partially alcoholyzed polyvinyl acetate. The slurry from the primary alcoholysis vessel overflows to an agitated hold vessel which provides additional residence time for completing the alcoholysis reaction. The slurry from the agitated hold vessel is then pumped through one or more finisher units to react short-circuited polyvinyl acetate, thus ensuring that the conversion is raised to 99.5% or higher of desired completion.

Preferred conversion is a degree of hydrolysis of about 93% or greater, or about 95% or greater, or about 98% or greater, or about 99% or greater.

The resulting first polyvinyl alcohol slurry (22) may then optionally be fed to a neutralizing unit (30) along with an acid (26) to neutralize less than a predominant portion (less than 50 equivalent %), or less than 25 equivalent %, or less than 10 equivalent %, or less than 5 equivalent %, of any excess alkali catalyst, and generate a second slurry (34). Typically, the acid employed is acetic acid. The temperature entering neutralizing unit (30) is slightly lower than in alcoholysis unit (18), generally in the range of from about 53° C. to about 60° C., and typically in the range from about 55° C. to about 58° C. Pressure conditions in neutralizing unit (30) are typically similar to those in alcoholysis unit (18).

If present, neutralizing unit (30) can be used to control the pH of the resulting second slurry (34).

In one embodiment, neutralizing unit (30) is not present (or is bypassed if present, or is present with substantially no acid feed, or is present with no acid feed), and the excess alkali catalyst is substantially not neutralized (or not neutralized) and remains in first slurry (22).

In one embodiment, second slurry (34) resulting from neutralization unit (30), if present, or if not present first slurry (22), is then fed to a thermal treating unit (38). The temperature of first slurry (22), or second slurry (34) if present, is reduced in thermal treating unit (38) to less than the temperature entering thermal treating unit (38). Depending on the desired morphology of the final polyvinyl alcohol particulate, the temperature can be reduced to less than 50° C., or to less than 40° C., or to less than 35° C., or to less than 30° C., or to less than 25° C., or to less than ambient conditions, with the lower temperatures resulting in higher amorphous and less crystalline content.

Thermal treatment unit (38) can be a holding tank with mild heating, or no heating or even active cooling so that the temperature of the slurry is reduced between entry and exit.

In one embodiment, thermal treating unit (38) is not present.

In one embodiment, the thermally treated slurry (42), or the second slurry (34) if thermal treatment unit (38) is not present or not utilized, or the first slurry (22) if thermal treatment unit (38) and neutralizing unit (30) are not present or not utilized, is fed to a solids-liquid separation unit (46) where polyvinyl alcohol is separated from the slurry to generate a polyvinyl alcohol wet cake (54) and separated liquids (50). The solids-liquid separation unit (46) can be a centrifuge and/or filtration device or other convention solids-liquid separation device.

In an alternate embodiment, the thermal treatment unit (38) and solids-liquid separation unit (46) can be combined in a single unit operation where the residence time of the slurry and solids is sufficient to reduce the temperature of the second slurry to the desired level.

In one embodiment, the process further comprises the step of washing the polyvinyl alcohol wet cake to produce a purified polyvinyl alcohol wet cake, which is then subject to the drying step. The resulting polyvinyl alcohol wet cake (54) can optionally be purified by feeding the wet cake (54) into a washing unit (62) where it is contacted typically with a fresh or recycled methanol stream (58) to remove ash components and other contaminates (70) to generate a purified polyvinyl alcohol wet cake (66).

In order to generate the particulate agglomerated polyvinyl alcohol particles (78), the purified polyvinyl alcohol wet cake after centrifugation (66), or the wet cake (54) if the washing unit (62) is not present or not utilized, is fed to a drying unit (74) where it is dried via conventional means to remove sufficient remaining liquid content (82) so that the resulting particulate agglomerated polyvinyl alcohol particles (78) can be recovered, preferably as a free-flowing powder.

Additional process details can be had by reference to previously incorporated U.S. Pat. Nos. 2,734,048, 3,497,487 and 3,654,247, as well as general knowledge of those of ordinary skill in the relevant art.

Product Properties

The starting polyvinyl acetates are vinyl acetate copolymers of a predominant amount of vinyl acetate with minor amounts of one more lower alkyl acrylate monomers. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers include methyl acrylate, methyl methacylate and mixtures thereof.

When present, the comonomers are typically used in amounts of about 20 mol % or less. In the case of methyl acrylate, the amount is typically about 10 mol % or less, based on the total moles of monomer. In the case of methyl methacrylate, the amount is typically about 5 mol % or less, based on the total moles of monomer.

The polyvinyl acetates will generally have an average degree of polymerization of from about 400 to about 10000, and more typically from about 400 to about 2000.

The resulting polyvinyl alcohols, of course, will have substantially the same monomer makeup and degree of polymerization as the starting polyvinyl acetates.

As indicated above, the polyvinyl alcohol preferably has a degree of hydrolysis of about 93% or greater, or about 95% or greater, or about 98% or greater, or about 99% or greater.

D(90) particles sizes of the polyvinyl alcohol agglomerated particles in accordance with the present invention range from about 1 μm, or from about 10 μm, to about 1000 μm, or to about 400 μm.

Bulk density of the composition in accordance with the present invention is preferably 0.55 g/cm3 or less, and more preferably about 0.50 g/cm$^3$ or less.

The polyvinyl alcohol particles in accordance with the present invention preferably have a % cold-water solubles, measured as described in the examples below, of about 50% or greater, or of about 60% or greater, or of about 75% or greater, or of about 80% or greater, or of about 85% or greater, or of about 90% or greater.

The non-heat-treated polyvinyl alcohol agglomerated particles in accordance with one embodiment of the present invention also have a reduced crystallinity/higher amorphous content than the heat-treated version. In one embodiment, a polyvinyl alcohol produced at 50° C. or less in the heat treatment step has a crystallinity reduced by about 2% to about 20% as compared to a polyvinyl alcohol produced under the same conditions except at 135° C., or except at 110° C., in the heat treatment step.

End Uses

The polyvinyl alcohol compositions of the present invention find use in many fields, for example, in adhesive compositions, in paper coating compositions including thermal paper, in coated board applications, as a carrier for optical brightening agents, as emulsion stabilizers, in pulp and for various fiber end uses, in wet end paper making, as encapsulants, in water-soluble films, in oilfield uses such as drilling muds, refracting, completion fluid and cements, in structural materials such as gypsum board, gypsum putty, wall putty, joint compound and cement additive, in textile sizing, and in paving materials such as polymeric sand and cement.

The polyvinyl alcohol particles in accordance with the present invention dissolve substantially completely in cold water (20° C.) in a short period of time compared to conventional polyvinyl alcohols, making them suitable for the production of aqueous solutions.

For example, the polyvinyl alcohol particles are suitable for rapid heating dissolving processes by using, for example, a device combining a slurry of polyvinyl alcohol particles and steam, such as a jet cooker device.

Such aqueous solutions can be used for paper processing, for example, as a paper inner sizing composition, a paper coating composition and so on. There has recently been a tendency for paper to decrease in surface strength because the percentage of waste paper in the raw material for pulp is increasing. The increased printing speed also requires improvement of paper in surface strength. It is common practice to use polyvinyl alcohol as coating agent or pigmented coating agent to improve the key surface properties of paper, such as surface strength, smoothness, gloss, gas barrier properties, water resistance, printability and solvent resistance. In the case of barrier paper, higher barrier properties are required. Offset printing that uses water, high water-resistant strength is required. For example, the present polyvinyl alcohol compositions can address these problems when used a paper coating agent, such as generally described in JP S63-112794A and JP S63-85198A.

There is a demand for a heat-sensitive recording material which has an excellent color developing sensitivity so that it can record images of not only characters but also drawings and photographs, accurately and neatly. Furthermore, there is a demand for a heat-sensitive recording material superior in water resistance, oil resistance, plasticizer resistance and preservation stability. The binders which are conventionally used in the heat-sensitive color developing layer are water-soluble polymers such as polyvinyl alcohol, methyl cellulose, hydroxycellulose, polyvinylpyrrolidone and oxidized starch. However, the heat-sensitive color developing layer obtained by the use of conventional binders has a problem in color development sensitivity, water resistance and preservation of images, although it is excellent in adhesion to the substrate. The surface protective layer is made from polyvinyl alcohol, acrylamide-modified polyvinyl alcohol, acetoacetate-modified polyvinyl alcohol, or aldehydopolyacrylamide-styrene copolymer. The conventional undercoating layer has a problem of short life of the thermal head.

The conventional heat-sensitive recording sheets have a problem in water resistance. The present polyvinyl alcohol compositions can address these problems when used in a heat-sensitive recording sheet as disclosed in JP06-64330A and EP0799711A1.

Other paper coating applications where the present polyvinyl alcohol compositions can find use include those disclosed in U.S. Pat. Nos. 5,057,570, 5,527,852 and 7,608,660B2.

The paper may include general paper, pigment coated paper (art paper, coated paper, cast-coated paper), synthetic paper and the like.

A paper coating composition comprising the aqueous solution for paper processing can be coated on a surface of a paper using conventional means such as a size press, an air knife coater, a roll coater, a bar coater, a blade coater, a curtain coater, a cast coater, and the like. Although the coating temperature (temperature of the paper coating composition) is not particularly limited, it is typically not less than about 10° C. and not more than about 60° C.

As a paper inner sizing composition, it is possible to internally add the aqueous polyvinyl alcohol solution when making paper.

The polyvinyl alcohol content in the aqueous solution used for producing paper processing is not particularly limited and is selected arbitrarily depending on the amount of coating (increased amount in dry weight of the paper caused by coating), the device used for coating, the operating conditions, and the like. Typically, polyvinyl alcohol content is typically not less than about 1 wt %, or not less than about 2 wt %, and typically not more than about 15 wt %, or not more than about 10 wt %, based on the total weight of the aqueous solution.

The same concentration is preferable also when the aqueous solution is used as a paper inner sizing composition.

The polyvinyl alcohol compositions of the present invention can be used in oilfield applications such as additives for drilling muds and drilling cements as disclosed in US2016/0229936A1.

The polyvinyl alcohol compositions can also be used in construction applications such as in joint filling compositions (see US2010/0144944A1), paving materials/polymeric sands (see US2006/0020058A1, US2014/0017006A1) and gypsum board (see US2004/0038065A1, US2004/0147644A1, US2004/0126602A1, US2002/0017222A1, WO97/30114A1, U.S. Pat. Nos. 5,437,722 and 3,935,021).

The polyvinyl alcohol compositions of the present invention can be used in applications such as provided in U.S. Pat. No. 6,746,781B2, which discloses the use of a polyvinyl alcohol with degree of hydrolysis greater than 95% and viscosity of about 25 to 70 cps as a binder to promote adhesion between the gypsum core and the adjacent facer sheet(s), avoiding the need to use in the gypsum core starch or other conventional binders. In one embodiment, the present invention thus provides an economical, lightweight gypsum board having good adhesion properties between the gypsum core and the adjacent facer sheets without the need for starch or other conventional binders, thereby overcoming certain drawbacks associated with presently available gypsum board technologies. The gypsum core of the wallboard can be of the type used in gypsum structural products commonly known as gypsum wallboard, dry wall, gypsum board, gypsum lath and gypsum sheathing. The core of such a product is formed by mixing water with powdered anhydrous calcium sulfate or calcium sulfate hemi-hydrate ($CaSO_4 \cdot \frac{1}{2}H_2O$) to form an aqueous gypsum slurry, and thereafter allowing the slurry mixture to hydrate or set into calcium sulfate dihydrate ($CaSO_4 \cdot 2H_2O$), a relatively hard material. The binder as described above provides adequate adhesive bond strength between the paper and/or fibrous mat facer(s), especially coated fibrous mats, and the set gypsum core without using starch.

Another water-resistant additive for use in the core of the gypsum-based core is an organopolysiloxane, for example, of the type referred to in U.S. Pat. Nos. 3,455,710, 3,623,895, 4,136,687, 4,447,498 and 4,643,771. One example of this type of additive is poly(methyl-hydrogen-siloxane). When used, the amount of the organopolysiloxane usually is at least about 0.2 wt % and often falls within the range of about 0.3 to about 0.6 wt %. The polyvinyl alcohol composition of the present invention is used as a binder in an effective amount to promote adhesion between the set gypsum core and the adjacent facer sheet(s), avoiding the need to use in the gypsum core starch or other conventional binders.

The present polyvinyl alcohol compositions can be used in an application such as disclosed in U.S. Pat. No. 3,853,689, which provides a gypsum board comprising a core of set gypsum having incorporated a sag resistance-improving amount of polyvinyl alcohol, and a pair of paper cover sheets with one cover sheet adhered to each face of the core of set gypsum. The gypsum core contains polyvinyl alcohol in an amount of from 0.150 to about 0.4 percent by weight of the gypsum in the core.

In another embodiment, the invention provides an improvement in a method of producing paper-covered gypsum board having a set core of gypsum in which a foamed aqueous slurry of calcined gypsum is prepared and the slurry is deposited between paper cover sheets. The slurry and paper cover sheets are formed into boards of the desired dimensions, and the boards are dried. The improvement comprises incorporating a sag resistance-improving amount of polyvinyl alcohol in the aqueous slurry.

The invention will be further understood from the following specific examples of the properties of the polymer. However, it will be understood that these examples are not to be construed as limiting the scope of the present invention in any manner.

Cold-Water Solubles (CWS) Measurement:

All cold-water solubles percentage values reported herein were determined as follows: a polyvinyl alcohol was added/dispersed into cold de-ionized water (20° C.) to a concentration of 4 wt % (g of polymer/g water). The mixture was then stirred with a triple bladed stirrer running at 200 rpm for at least 3 hours at 20° C. The slurry was then transferred to a 40 ml centrifuge bottle and centrifuged at 1500 rpm for 10 minutes. An aliquot of the resulting supernatant liquid was evaporated to dryness and the CWS content is calculated as follows:

$$\% \text{ CWS} = (\text{Wt. of aliquot} \ast 200)/(\text{Wt. of aliquot} \ast 8) \ast 100$$

Yellowness Index Determination:

The yellowness index of the samples was determined Hunter colorimeter.

Viscosity Determination:

The viscosity of the sample was determined as a 4% solids aqueous solution at 20° C. by the Hoeppler falling ball method.

pH Determination:

The pH of the sample was determined as a 4% aqueous solution.

Sample C1 was a substantially fully-hydrolyzed polyvinyl alcohol prepared from poly(vinyl acetate/lower alkyl acrylate) copolymer commercially available under the trade designation ELVANOL™ 80-18 (Kuraray America, Inc., Houston, Tex. USA). This product is produced utilizing the commercial process described above with neutralization, heat treatment by adding heat to raise temperature from about 50° C. to about 110° C., and methanol washing.

For Sample 1, an amount of polyvinyl alcohol slurry in methanol was obtained from the commercial process for preparing Sample C1, but before the polymer was subjected to neutralization (no neutralization, no heat treatment and no washing). The polymer was obtained by filtering the slurry using cheesecloth, then was dried in a vacuum oven at 50° C. overnight. The polyvinyl alcohol obtained was a white, granular polymer having degree hydrolysis of 99.7%.

For Sample 2, an amount of the polyvinyl alcohol slurry used for Sample 1 was placed in a 4 liter glass jar fitted with a three-blade glass agitator. 1000 mL of methanol was added to the sample and the mixture was continuously agitated. The product was maintained at room temperature. The product was discharged from the flask after a residence time of about 30 minutes. The polymer obtained was then filtered using cheesecloth. The procedure was repeated twice to get rid of impurities. The product was then dried in a vacuum oven at 50° C. overnight.

For Sample 3, an amount of polyvinyl alcohol slurry in methanol was obtained from the commercial process for preparing Sample C1, but before the polymer was subjected to neutralization (no neutralization, no heat treatment and no washing). The polymer was obtained by filtering the slurry using cheesecloth, then was dried at room temperature. The polyvinyl alcohol obtained was a white, granular polymer having degree hydrolysis of 99.7%.

For Sample 4, the polyvinyl alcohol slurry from Sample 3 was used, except that the slurry was dried under vacuum at 105° C. for 3 hours.

Measurement results are provided in the following table.

| Sample | pH  | Viscosity (mPa · s) | YI   | CWS (%) |
|--------|-----|---------------------|------|---------|
| C1     | 5.7 | 19.6                | 7.8  | 2.8     |
| 1      | 6.6 | 21.9                | 3.22 | 83.6    |
| 2      | 6.3 | 18.2                | 2.96 | 78.1    |
| 3      | 6.5 | 17.0                | 2.33 | 94.1    |
| 4      | 6.6 | 20.0                | 3.64 | 91.5    |

We claim:

1. A polyvinyl alcohol composition of particulate agglomerated polyvinyl alcohol particles, wherein:
   (1) the polyvinyl alcohol is a copolymer of a monomer component consisting essentially of vinyl acetate with one or more $C_1$ to $C_8$ alkyl acrylate ester monomers and/or one or more $C_1$ to $C_8$ alkyl methacrylate ester monomers in an amount up to about 20 mol %, based on the total monomer component, with a degree polymerization of from about 400 to about 10000, and a degree of hydrolysis of about 93% or greater; and
   (2) the composition has a D(90) particle size of from about 1 μm to about 1000 μm, a bulk density of about 0.55 g/cm³ or less, and a cold-water (20° C.) solubles of about 50% or greater.

2. The polyvinyl alcohol composition of claim 1, having a cold-water (20° C.) solubles of about 60% or greater.

3. The polyvinyl alcohol composition of claim 1, having a cold-water (20° C.) solubles of about 75% or greater.

4. The polyvinyl alcohol composition of claim 1, having a cold-water (20° C.) solubles of about 80% or greater.

5. The polyvinyl alcohol composition of claim 1, having a cold-water (20° C.) solubles of about 90% or greater.

6. The polyvinyl alcohol composition of claim 1, having a bulk density of about 0.50 g/cm3 or less.

7. The polyvinyl alcohol composition of claim 1, wherein an amount of the one or more $C_1$ to $C_8$ alkyl acrylate ester monomers and/or one or more $C_1$ to $C_8$ alkyl methacrylate ester monomers is up to about 10 mol %, based on the total monomer component.

8. The polyvinyl alcohol composition of claim 1, wherein the one or more $C_1$ to $C_8$ alkyl acrylate ester monomers and/or one or more $C_1$ to $C_8$ alkyl methacrylate ester monomers are selected from the group consisting of methyl acrylate, methyl methacrylate and mixtures thereof.

9. The polyvinyl alcohol composition of claim 8, wherein the polyvinyl acetate is a copolymer of a monomer component consisting essentially of vinyl acetate and methyl acrylate.

10. A polyvinyl alcohol composition produced in a slurry alcoholysis process using an alcoholysis catalyst, in which the alcoholysis catalyst has not been predominantly neutralized, wherein a polyvinyl acetate subjected to the slurry alcoholysis process is a copolymer of a monomer component consisting essentially of vinyl acetate with one or more $C_1$ to $C_8$ alkyl acrylate ester monomers and/or one or more $C_1$ to $C_8$ alkyl methacrylate ester monomers in an amount up to about 20 mol %, based on the total monomer component; and wherein the polyvinyl alcohol of the composition has a reduced lactone ring content as compared to a polyvinyl alcohol produced under the same conditions except that a predominant amount of a residual catalyst has been neutralized;
   wherein the composition is in the form of agglomerated particles having a D(90) particle size from about 1 μm to about 1000 μm, and a bulk density of less than 0.50 g/cm³ or less.

11. A process for preparing the polyvinyl alcohol composition of particulate agglomerated polyvinyl alcohol particles of claim 1, comprising the steps of:
   (A) providing to an alcoholysis unit (i) a solution of a polyvinyl acetate in a solvent and (ii) an alkali catalyst, wherein the polyvinyl acetate is a copolymer of a monomer component consisting essentially of vinyl acetate with one or more $C_1$ to $C_8$ alkyl acrylate ester monomers and/or one or more $C_1$ to $C_8$ alkyl methacrylate ester monomers in an amount up to about 20 mol %, based on the total monomer component;
   (B) combining the solution and the alkali catalyst in the alcoholysis unit under agitation to hydrolyze the polyvinyl acetate to produce a first slurry comprising (i) a polyvinyl alcohol having a degree of hydrolysis of about 93% or greater and (ii) residual alkali catalyst;
   (C) removing the first slurry from the alcoholysis unit;
   (D) separating polyvinyl alcohol from the first slurry to produce a polyvinyl alcohol wet cake; and
   (E) drying the polyvinyl alcohol wet cake to produce the particulate agglomerated polyvinyl alcohol particles,
   wherein the residual alkali catalyst in the first slurry is predominantly not neutralized prior to the drying step.

12. The process of claim 11, wherein the polyvinyl acetate has (i) a degree of polymerization of from about 400 to about 10000, or (ii) a degree of hydrolysis of about 99% or greater, or (iii) both (i) and (ii).

13. The process of claim 11, wherein the polyvinyl acetate is a copolymer of a monomer component consisting essentially of vinyl acetate with one or more $C_1$ to $C_8$ alkyl acrylate ester monomers and/or one or more $C_1$ to $C_8$ alkyl methacrylate ester monomers in an amount up to about 10 mol %, based on the total monomer component.

14. The process of claim 11, wherein the one or more $C_1$ to $C_8$ alkyl acrylate ester monomers and/or one or more $C_1$ to $C_8$ alkyl methacrylate ester monomers are selected from the group consisting of methyl acrylate, methyl methacrylate and mixtures thereof.

15. The process of claim 14, wherein the polyvinyl acetate is a copolymer of a monomer component consisting essentially of vinyl acetate and methyl acrylate.

16. The process of claim 11, wherein the residual alkali catalyst in the first slurry is substantially not neutralized prior to the drying step.

17. The process of claim 11, wherein the first slurry is removed from the alcoholysis unit at a first temperature, and the temperature of the first slurry is reduced to less than the first temperature prior to or concurrently with the separating step.

18. The process of claim 17, wherein the temperature of the first slurry is reduced to less than 50° C.

19. The process of claim 11, wherein the process further comprises the step of washing the polyvinyl alcohol wet cake to produce a purified polyvinyl alcohol wet cake, which is then subject to the drying step.

20. The process of claim 11, wherein the particulate agglomerated polyvinyl alcohol particles from the drying step are substantially free-flowing particles.

\* \* \* \* \*